United States Patent
Kleine et al.

(10) Patent No.: US 6,189,633 B1
(45) Date of Patent: Feb. 20, 2001

(54) DRILL

(75) Inventors: Werner Kleine, Achim; Hans-Werner Bongers-Ambrosius, Munich, both of (DE)

(73) Assignee: Hilti Aktiengesellschaft, Schaan (DE)

( * ) Notice: Under 35 U.S.C. 154(b), the term of this patent shall be extended for 0 days.

(21) Appl. No.: 09/264,350

(22) Filed: Mar. 8, 1999

(30) Foreign Application Priority Data

Mar. 10, 1998 (DE) .............................................. 198 10 193

(51) Int. Cl.$^7$ ..................................................... E21B 10/36
(52) U.S. Cl. ....................... 175/418; 175/420.1; 175/426; 175/432
(58) Field of Search ................................... 175/414–418, 175/420.1, 425, 426, 428, 432

(56) References Cited

U.S. PATENT DOCUMENTS 5,297,643 * 3/1994 Montgomery et al. ............... 175/393
5,996,714 * 12/1999 Massa et al. ........................ 175/413

* cited by examiner

Primary Examiner—Roger Schoeppel
(74) Attorney, Agent, or Firm—Brown & Wood, LLP

(57) ABSTRACT

A drill for forming bores in constructional components, and including a sleeve-shaped stem (2; 12; 22; 32; 42; 52) having an axially-extending through-bore (3; 13; 23; 33; 43; 53) which opens into mouth openings (7; 10; 14; 24; 34; 44; 54) formed in opposite end sections of the stem (2; 12; 2; 32; 42; 52); a shank (5) provided at a rear end of the stem, and a drilling head (8; 15; 25; 35; 45; 55) formed of a hard material and secured in at least one slot (19; 29; 49; 59) formed in a free front end of the stem (2; 12; 22; 32; 42; 52), with a section of the drilling head (8; 15; 25; 32; 45; 55), which is embedded in the stem (2; 12; 22; 32; 42; 52), flatly engaging a material of the stem (2; 12; 22; 32; 42; 52) and being fixedly connected with the stem material.

18 Claims, 3 Drawing Sheets

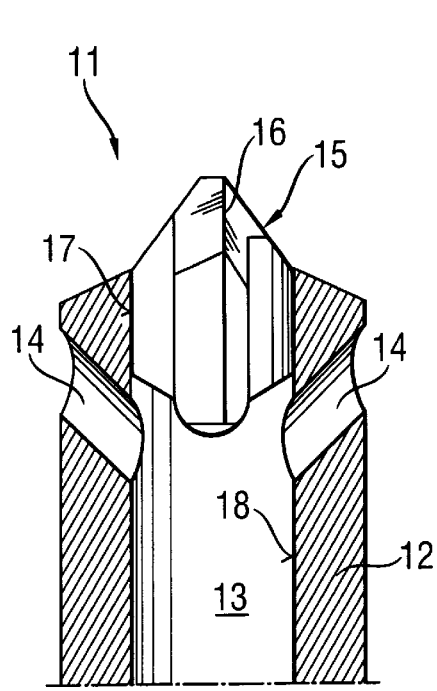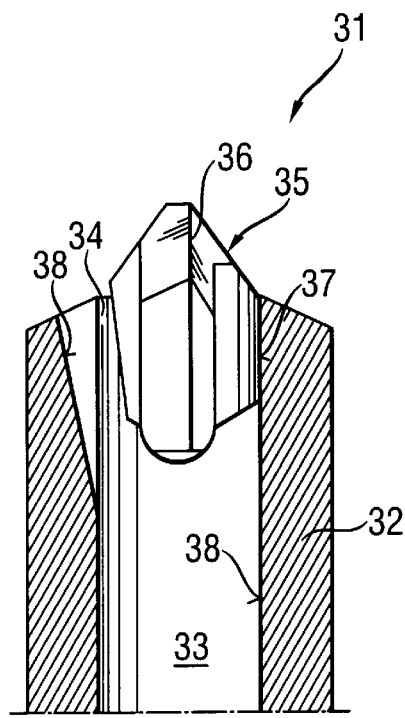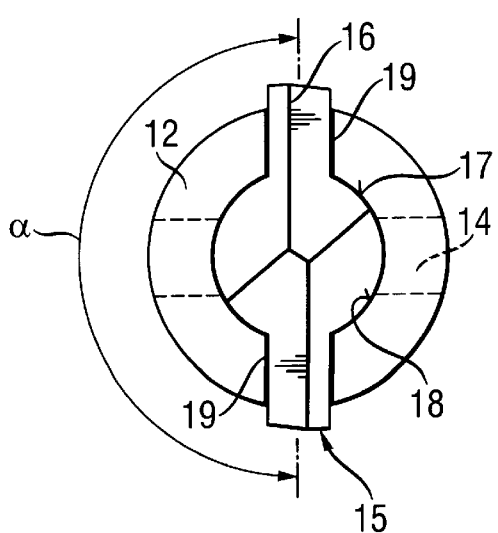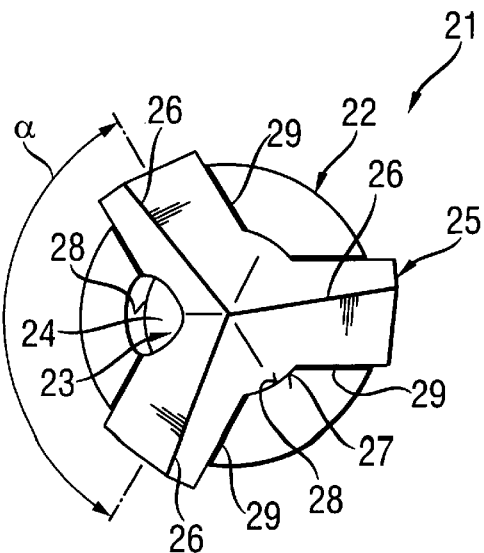

DRILL

BACKGROUND OF THE INVENTION

1. Field of the Invention

The present invention relates to a drill for forming bores in constructional components made of stone, concrete, break and the like and including a sleeve-shaped stem having an axially extending through-bore which opens into at least one mouth opening formed in a front end section of the stem, a shank provided at a rear end of the stem opposite the front end section of the stem for connecting the drill to a drilling tool, and a drilling head provided with lips and formed of a hard material and secured in at least one slot formed in a free end of the stem.

2. Description of the Prior Art

In addition to known drills for forming bores in constructional components of stone, concrete, break and the like, in which the drillings, which are formed during the drilling process are removed through at least one helical groove provided on a drill stem, in the past, so-called suction drills were used. They represent a drill with an axial bore which is connected with a vacuum-producing apparatus, in particular a vacuum dust collector, by an adapter and a coupling element. A suction drill should insure a high drilling capacity as a result of sucking of the drillings, which are formed during the drilling process, away and should provide for better cleaning of the bore. Such a suction drill is disclosed, e.g., in a German document DE-A-27 57 140. The known suction drill has a stem provided with an axial bore and having its end inserted in an adapter which is surrounded by a coupling element and, at the opposite end of the stem, a drilling head with a hard metal plate-like bit is releasably screwed in the stem. The suction bore is connected with a bore provided in the drilling head and which opens on opposite sides of the plate-like bit. The suction bore is connected, via the adapter and the coupling element, with a vacuum dust collector. During the drilling process, the formed drillings are transported away through the drilling head and the suction bore to the vacuum dust collector.

The known suction drill has a replaceable drilling head which is screwed in the stem. The drilling head is replaced upon wear of the hard metal bit or clogging of the mouth openings. When the known suction drill is used with a hammer drilling tool, the large single-blow energy of an axial impact results in an excessive loading of the helical thread in the stem and of the drilling head thread. The large single-blow energy of the axial impacts can lead to an excessive wear of both threads and, as a result, the connection of the drilling head with the stem is weakened. On the other hand, as a result of rotation of the drill during the drilling operation, the thread connection between the drilling head and the stem is so tightened that a very large force is required to unscrew the drilling head, if necessary, or that the drilling head cannot be unscrewed at all. Besides, the manufacturing of the known suction drill is rather expensive. Furthermore, the formation of an axial bore in a stem, which is made of a relatively long steel bar, sets high demand to the manufacturing technology.

To eliminate the drawbacks of the known suction drill and to facilitate its manufacturing, German Utility Model DE-U-79 08 923 proposed to form the drill stem of a steel sleeve. In the proposed suction drill, an end of the sleeve-shaped stem is connected with an adapter which is surrounded by a non-rotatable coupling element connected, e.g., with a vacuum dust collector. The adapter is also equipped with a shank which forms an axial extension of the stem and serves for connecting the drill with a drilling tool. The steel sleeve is provided at its opposite end with axial slots forming a cross-like pattern. A one-piece sintered cross-shaped bit formed of a hard metal is pushed into the axial slots and is secured there. The shape of the bit and the inner diameter of the sleeve-shaped stem are so selected that openings remain between the lips of the bit and the inner wall of the stem, which are connected with the axial channel formed in the stem.

The drill, which is disclosed in the German Utility Model De-U-79 08 923, has a relatively small stability in the region of the drilling head. The one-piece sintered cross-bit is supported only in the axial slots. The shearing forces, which are generated during the rotary-percussion drilling of a constructional component, act almost entirely on the cross-bit. As a result, the cross-bit can separate from slots, or the hard metal can burn out. The shape of the lips arranged in a cross-like pattern is so selected that, as it has already been discussed above, open regions remain between the lips and the stem inner wall.

These open regions extend along the axial channel or bore formed in the stem. The lips have a strip-like shape and have a height which increases toward the cross-shaped region. In this way, separate lips form, in the cross-shaped region, cutting points which span the axial channel without any support. During the drilling process, the projecting cutting points are subjected to a very large load as a result of application of axial blows. The shape of the cross-bit, in particular in connection with the use of the drill with a hammer drilling tool which is characterized, as discussed above, by a high single-blow energy of the axial impacts, can result in breaking of the one-piece sintered cross-bit. As it has also been discussed above, the openings, which are limited by the bit and the stem inner wall, are axially oriented. During the drilling process, the end of the drilling head can become completely submerged in the drillings. In this case, the suction action becomes insufficient for a quick removal of the drillings, and the opening could become clogged.

Accordingly, an object of the present invention is to eliminate the drawbacks of a suction drill disclosed in the prior art. Another object of the present invention is to provide a drill having a sleeve-shaped stem and a sintered drilling head which is formed entirely of a cutting material, preferably, of hard metal. A further object of the present invention is to provide a drill in which the danger of failure or breaking of the drilling head is substantially reduced. A still further object of the present invention is to provide a drill in which the attachment of the drilling head can be effected in a simple and reliable way. A yet another object of the present invention is to provide a drill in which clogging of the openings, which are provided in the front end section of the stem and which communicate with the stem through-bore, with the drillings is prevented.

SUMMARY OF THE INVENTION

These and other objects of the present invention, which will become apparent hereinafter, are achieved by providing a drill for forming bores in constructional components made of stone, concrete, break and the like and including a sleeve-shaped stem having an axially extending through-bore which opens into mouth openings formed in opposite end sections of the stem. A shank is provided at a rear end of the stem for connecting the drill to a drilling tool. A drilling head provided with lips and formed of a hard material is secured in at least one, preferably radially extending slot formed in a free front end of the stem. A section of the driling head which is embedded in the stem flatly engaging a material of the stem and is fixedly connected with the stem material.

The retention of the drilling head in at least one, preferably, radially extending slot, and shaping the section of the drilling head, which is embedded in the stem, according to the present invention insure that the drilling head is supported in the stem over a larger portion of its circumference. As a result, the shearing forces, which are generated during the drilling process, do not act almost exclusively on the drilling head. As a result of a flat engagement of the drilling head with the stem material and of a fixed connection of the embedded portion of the drilling head with the stem, e.g., by soldering or welding, the axial impacts, which act on the drill during the drilling process are absorbed by the stem, reducing the load applied to the drilling head.

The adaptation of the major portion of the outer contour of the drilling head section embedded in the stem to the contour of the inner wall of the stem results, in particular, in the enlargement of the drilling head in its central, cutting region. As a result, the region of the drilling head, which is subjected during the drilling process, to the highest axial blow energy, is reinforced. Though the central, cutting region usually has no support in the axial direction, the reinforcement of this region, the danger of breaking of the drilling head, as a result of application of axial impacts, is reduced. The drilling head is supported by the stem practically over its entire circumference, so that the shearing forces, which are generated during operation of the drill, are reliably transmitted to the stem. The arrangement of the drilling head in at least one slot provided in the front end of the stem and the selected geometry of the drilling head facilitate attachment of the drilling head to the stem. The coincidence of the outer contour of a major portion of the embedded section of the drilling head with the inner contour of the stem insures soldering or welding of the drilling head to the stem over a larger portion of the drilling head circumference. Thereby, the danger of loosening of the drilling head during operation is reduced. The manufacturing of a steel sleeve is cost-effective, in particular, if it has a smooth inner wall. Also, it is not any more necessary to a form a bore in a solid steel bar by an expensive manufacturing process. Rather, a steel sleeve with a required outer diameter and a required bore diameter can be easily produce in a continuous process. Then, a stem with a desired length can be cut off.

The trough-bore is connected with mouth opening or openings which are formed in the front section of the stem. The mouth opening or openings are offset backwards with respect to the lips. Thereby, clogging of the mouth openings, even with an insufficient suction power, at the beginning of the drilling process is prevented. Advantageously, the mouth openings are oriented toward the stem outer surface. This further reduces the danger of the mouth openings being clogged. For manufacturing reasons, the mouth openings are formed with circular, elliptic, or oval cross-section. The curved circumferential contour of the mouth openings has no irregularities which can result in adherence of the sucked drillings to the walls of the mouth openings.

According to one embodiment of the present invention, the through-bore of the stem is connected with at least one mouth opening which is formed by a mouth of channel which is formed in the drilling head and extends to the through-bore preferably at an angle from 10° to 70°. The mouth opening is offset relative to the lips of the drilling head axially and laterally. The lateral offset is advantageously so selected that the mouth opening is spaced from the following lip, in the rotational direction, by an angular distance of less than 90°. The selected axial and lateral offset of at least one mouth opening prevents its immersion in the removed material accumulating on the bore bottom. In this way, the suction power through the through-bore remains unchanged. The angular distance between the mouth opening and the lip insures sucking of the removed material away immediately as it formed.

According to an advantageous embodiment of the present invention, the through-bore of the sleeve-shaped shaft opens into at least one month opening which is limited by the drilling head and the stem inner wall. Advantageously, the mouth opening, which is inclined toward the stem axis, is formed by a recess which is provided at the stem front end and/or in the drilling head. The mouth opening is located in the joint region of the drilling head and the stem. It is formed automatically upon assembly of the drilling head with the stem when, e.g., a recess is provided in the stem wall at the end surface of the stem. One or more mouth openings can be formed by any combination of recesses in the drilling head and at the front end of the stem.

According to a further embodiment of the invention, the mouth opening of the trough-bore is formed as a bore in the wall of the front section of the stem. In this case, the outer contour of the drilling head is so formed that it flatly abuts the sleeve-shaped stem along its entire circumference. The opening in the stem wall can be formed before or after mounting of the drilling head.

Advantageously, the at least one mouth opening has a cross-section which is smaller than the cross-section of the through-bore. E.g., a cross-section of a mouth opening can amount to from 30% to 70% of the cross-section of the through-bore. In case, there are several mouth openings, advantageously, the sum of the cross-sectional surfaces of all mouth openings is smaller than the cross-section of the through-bore. The larger cross-section of the through-bore prevents sucking of drillings the diameter of which is larger than the diameter of the through-bore. Thereby, clogging of the through-bore is prevented to a most possible extent. In a worst case scenario, the mouth opening can become clogged for a very short period of time.

Because of the cross-sectional relationships, the clogging, however, can take place only in the vicinity of the mouth openings and is simply eliminated by pushing the removed bore material into the wider through-bore. For pushing the waste material, a needle or a hook can be used. The selected relationship between the cross-section of the mouth opening or openings and the cross-section of the through-bore permits to provide a sufficiently high vacuum in the bore which insures immediate removal of the drillings through the drill stem. This prevents clogging of the through-bore with drillings in case an excess amount of the drillings is sucked in which could not be removed sufficiently rapidly.

The flat abutment of the drilling head with the inner wall of the through-bore is improved when the through-bore has, at least in the embedding region for the drilling head, a cross-section which deviates from a circular shape, with the stem dimensions being adapted to those of the drilling head. E.g., the cross-section can be elliptical or oval. In an alternative embodiment of the present invention, the cross-section can be formed by two parallel sides connected with each other by arcuate arcs. In this way, the contour of the inner wall is adapted very well to unusually flat side surfaces of the drilling head. The through-bore can also have a polygonal cross-section.

A cross-section of the through-bore, which deviates from a circular shape is realized particularly easy when the sleeve-shaped stem has, at least in the embedding region for the drilling head, an outer contour that also deviates from a circular shape.

In this case also, the outer contour can be elliptical, oval or polygonal. When the cross-sections of the through-bore and the stem outer contour coincide, the stem has, at least in the embedding region, a constant wall thickness. In this case, local weakening of the stem material is prevented.

In accordance with one of the embodiment of the inventive drill, the front section of the sleeve-shaped stem, in particular, in the embedding region for the drilling head, is formed as a substantially solid section which has, preferably, a smaller cross-section than the next adjoining section of the stem. This is achieved by reduction of the diameter of a tubular stem, which has a uniform cross-section, in the region forming the embedding region. The reduction of the diameter can take place until the through-bore in the front region of the stem is completely closed or closed to a most possible extent. Then a slot is formed in the free end of the diameter-reduced front section. The drilling head is inserted into the slot and is soldered or welded to the stem. The inserted section of the drilling head is surrounded by a solid material and is fixedly connected with the surrounding material. Thus, the stem material provides a particularly good support for the drilling head, which permits the drilling head to withstand the shearing forces generated during the drilling process. The reduction of the diameter of the through-bore or its complete closure insures that stem material is provided beneath the middle region of the drilling head, insuring an axial support of the drilling head. This provides for a better absorption by the stem of axial blows or impacts acting on the drilling head during the drilling process.

The mouth opening, with which the through-bore is connected, can be formed by a mouth of a channel formed in the drilling head. It can also be provided in the wall of the tubular stem. It should be understood that the solid embedding region for the drilling head can be formed even when the stem has a uniform diameter along its length. This can be achieved, e.g., when during manufacturing of the drill, a tubular stem is formed the front section of which has a larger diameter than the remaining portion of the stem. During a subsequent manufacturing step, the larger-diameter front section is reduced to the diameter of a conventional stem. At that, the through-bore in the region of the front section becomes completely or almost completely closed. The embedding of the drilling head is then effected in a manner described above.

To provide for a better support of the drilling head in the stem, the stem is provided with at least two, preferably radially extending slots with a smallest angular distance there between from 90° to 180°. With the selected angular distance between the drilling head-receiving slots, a sufficient amount of the shaft material remains between the slots for supporting the drilling head. According to an advantageous embodiment of the inventive drill, the drilling head is received in three radially extending slots. The stem has, at least in the embedding region for the drilling head, a substantially polygon-shaped outer contour. The slots are so arranged that they extend at angle of approximately 90°±10° to the outer surface of the front section of the stem. The drilling head of this embodiment is formed preferably as a three-lip drilling head, with the lips extending above the slots approximately parallel thereto. Preferably, the angular distance between the lips amounts to about 120°. Such a drill is characterized by a uniform engagement with the removable material of the constructional component and by good penetration into the bore.

BRIEF DESCRIPTION OF THE DRAWINGS

The features and objects of the present invention will become more apparent, and the invention itself will be the best understood from the following detailed description for the preferred embodiments when read with reference to the accompanying drawings, wherein:

FIG. 2 shows a partial cross-sectional view of another embodiment of a drill according to the present invention with an inserted drilling head;

FIG. 3 shows a plan view of the drilling head shown in FIG. 2;

FIG. 4 shows a plan view of a drilling head for a drill according to the present invention, which is modified in comparison with the drilling head shown in FIG. 3;

FIG. 5 shows a partial cross-sectional view of a further embodiment of a drill according to the present invention with an inserted drilling head;

DETAILED DESCRIPTION OF THE PREFERRED EMBODIMENTS

Figure 1:
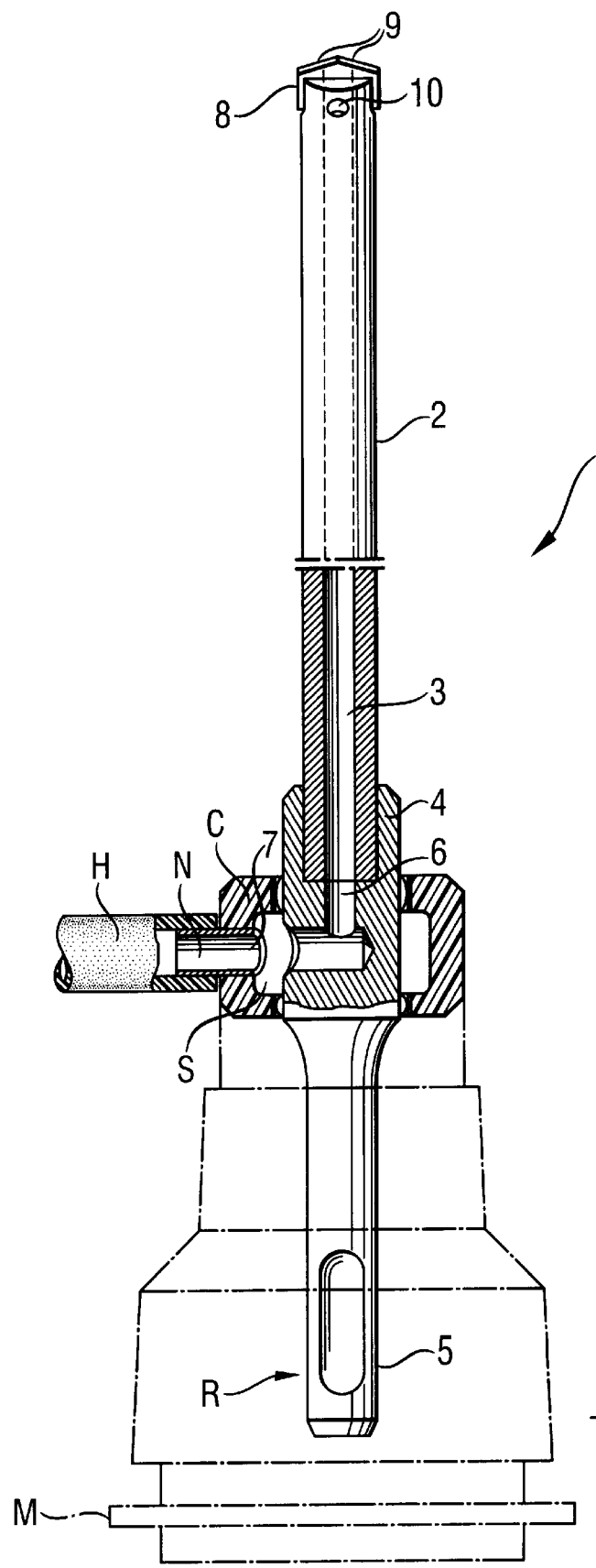
FIG. 1 shows a side elevational, partially cross-sectional view of a drill according to the present invention received in a chuck of a hammer drilling tool.

FIG. 1 shows a drill according to the present invention and generally designated with a reference numeral 1, which is received in a chuck R of a drilling tool M, e.g., a hammer drilling tool. The drill 1 has a sleeve-shaped stem 2 with a through-bore 3. One end of the sleeve-shape stem 2 is connected, e.g., is soldered to a connection element 4 having a shank 5 which is received in the chuck R of the drilling tool M, connecting the drill 1 with the drilling tool M. The through-bore 3 of the sleeve-shaped stem 2 is connected with a bore 6 in the connection element 4 which opens into an opening 7 formed on the circumference of the connection element 4. The drilling tool M has a non-rotatable coupling element C, which forms an extension of the chuck R. The coupling element C has an annular space S connected with the mouth opening 7 of the bore 6. The annular space S opens into a connection nipple N to which a suction hose H is connected. A drilling head 8 is provided at an end of the sleeve-shaped stem 2 opposite the end of the stem 2 connected with the connection element 4. The drilling head 8 is provided with lips 9 and is formed entirely of a hard metal. The drilling head 8 has at least one suction channel that extends at an angle to the through-bore 3 in the stem 2 and opens into an opening 10 formed sidewise of the lip 9.

The coupling element C of the drilling tool M is connected by the suction hose H with a suction device, not shown, e.g., a vacuum dust collector. With the connected vacuum dust collector, a vacuum is applied to the opening 10 via the suction hose H, the annular space S, the bore 6 of the connection element 4, the through-bore 3 and the suction channel formed in the drilling head 8 and leading to the opening 10. The vacuum provides for transporting of the drillings, which are formed during boring with the lips 9, through the drilling head 8, the through-bore 3 in the sleeve-shaped stem 2, and the bore 6 in the connection element 4 to the suction hose H and the vacuum dust collector.

FIGS. 2–7 show essential components of the inventive drill. In the embodiment of the inventive drill shown in FIGS. 2–3 and designated with a reference numeral 11, the drilling head 15 has diagonally extending lips 16. The lip-carrying sections of the drilling head 15 project beyond the outer diameter of the sleeve-shaped stem 12 and extend through two slots 19 formed in the front end of the stem 12 opposite each other. The region between the lips 16 on their opposite sides consists of two semi-circular portions extending beyond the lip-carrying sections of the drilling head 15. The outer contour 17 of the widened portion of the drilling head 15 is adapted to the contour of the inner wall 18 of the through-bore 13 of the stem 12. E.i., the diameter of the drilling head 15 in the region of the widened portion of the drilling head 15 corresponds to the diameter of the through-bore 13 of the stem 12. This adaptation insures that a substantial portion of the circumference of the drilling head 15 flatly engages the inner wall 18 of the through-bore 14 of the stem 12. The section of the drilling head 15 imbedded in the stem 12 is fixedly connected with the stem material by soldering or welding. In this way, it is insured that the drilling head 15 is held over its entire circumference by the slots 19, which are formed in the front end of the stem 12, and by the inner wall 18 of the through-bore 13 of the stem 12. In the region of its front end, the stem 12 is provided with openings 14 connected with the through-bore 13.

FIG. 4 shows a plan view of another embodiment of the inventive drill generally designated with a reference numeral 21 and equipped with a modified drilling head 25. The drilling head 25 has three lips 26 extending preferably, at an angle of 120° to each other. The lip-carrying sections of the drilling head 25 project beyond the circumference of the sleeve-shaped stem 22 and extend through corresponding slots 29 formed in the front end of the stem 22. Two of the regions, which are formed between the lip-carrying sections of the drilling head 25, have widening portions the outer contour 27 of which is so adapted to the inner wall 28 of the stem 22 that a flat engagement with the inner wall 28 is insured. In the third region between two lips 26, the bore head 25 is formed with a recess. The recess defines a mouth opening 25 of the through-bore 23 of the stem 22. The mouth opening 24 is limited by the wall of the drilling head 25 and the inner wall 28 of the stem 22 of the drill 21.

FIG. 5 shows a further embodiment of the inventive drill which is generally designated with a reference numeral 31. The drilling head 35 of the drill 31 has three diagonally extending lips 36. As in the previously described embodiments of the inventive drill, the lip-carrying sections of the drilling head 35 project beyond the outer diameter of the sleeve-shaped stem 32 and extend through corresponding slots formed in the front end of the stem 32. The drilling head 35 has, at one of its sides, a thickening the outer contour 37 of which is adapted to the inner wall 38 of the shaft 32. At its opposite side, the drilling head 35 has a tapering contour defining a mouth opening 34 which is limited by the wall of the drilling head 35 and by the inner wall 38 of the sleeve-shaped stem 32. The mouth opening 34 can have a widening section defined by a bevel portion of the inner wall 38 which extends from the end surface of the stem 32 toward the drill axis.

Figure 6:
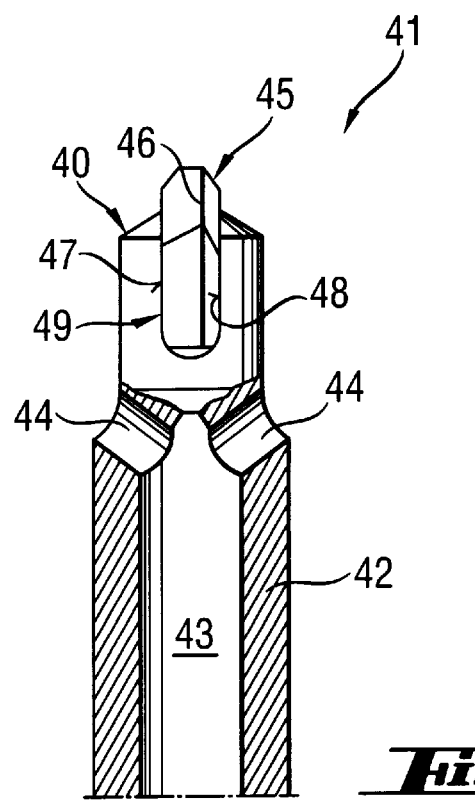
FIG. 6 shows a partial cross-sectional view of a still further embodiment of a drill according to the present invention with an inserted drilling head.

FIG. 6 shows a still further embodiment of the inventive drill generally designated with a reference numeral 41. The stem 42 of the drill 41 has a reduced-diameter embedding section 40 for receiving a plate-shaped drilling head 45 provided with lips 46. The reduced-diameter embedding section 40 is formed as a solid section. The reduced-diameter embedding section is formed as follows. After a tubular stem 42 having the same diameter along its entire length is formed, the diameter of the stem 42 is reduced in the region which corresponds to the reduced-diameter embedding region 40. The reduction of the diameter can take place until the front portion of the stem 42, which corresponds to the embedding section 40, closes the through-bore 43 completely or to the most possible extent. Then, the embedding section-defining front portion of the stem 42 is slotted from its free front end so that a slot 49 for receiving the drilling head 45 is formed. After the drilling head 45 is inserted in the slot 49, it is secured to the stem 42 by welding or soldering. The substantially flat side surfaces 47 of the drilling head 45 flatly abut the side wall 48 of the receiving slot 49. The through-bore 43 opens into a openings 44 which are formed in the sleeve-shaped stem 42 beneath the embedding section 40.

Figure 7:
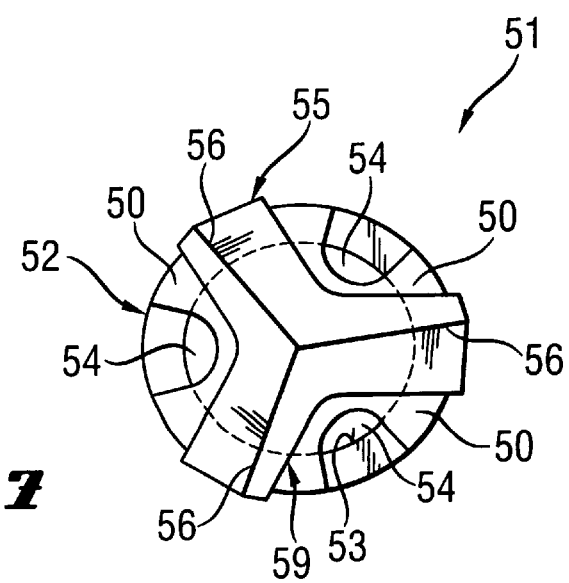
FIG. 7 shows a plan view of a yet another embodiment of a drill according to the present invention with a three-lip drilling head.

FIG. 7 shows a yet another embodiment of the drill according to the present invention, which is generally designated with a reference numeral 51. The drill 51 has a stem 52 having a non-circular cross-section. The front section 50 of the stem 52, which form an embedding section for a drilling head 55, has several indentations. The indentations are so arranged that they provide as large as possible surface over which the drilling head 55 with lips 56 is soldered to the stem 52. As a result of indentation, the front section 50 has a substantially polygonal outer contour. The slots 59 for receiving the drilling head 55 are so arranged that they extend to the outer surface of the front section 50 at angle of about 90°±10°. The mouth openings 54 formed in the wall of the stem 52 are connected with the through-bore 53. Each mouth opening 54 is associated with a respective lip 56. The mouth opening 54 are so arranged that the an angular distance in the rotational direction between a leading mouth opening 54 and trailing it lip 56 is less than 90°.

As is particularly can been seen FIGS. 3, 4 and 7, the lip-carrying sections of the drilling heads 15, 25 and 55 extend through slots 19, 29 and 59 which are formed in respective front sections of the respective stems 12, 22, 52 of the respective drills 11, 21, 51 and extend from each other by an angular distance α, preferably in a range from 90° to 180°. As shown, in all of the embodiments of the inventive drill, respective mouth openings 10, 14, 24, 34, 54 have smaller cross-sections than the respective through-bores 3, 13, 23, 33, and 53. When more than one mouth opening are provided, the sum of their cross-sectional surfaces is smaller than a cross-section of a respective through-bore. Advantageously, the cross-sections of the mouth openings 10, 14, 24, 34, 44 and 54 amounts to from about 30% to about 70% of the cross-sections of the through-bores 3, 13, 23, 33, 43 and 53, respectively.

In the embodiments of the inventive drill shown in the drawings, the through-bores 3, 13, 23, 33, 43, and 53 have an approximately circular cross-section. It should be understood that a cross-section of a through-bore of a sleeve-shaped drill stem can deviate from a circular shape if this is necessary for a better embedding of the drilling head. A stem through-bore can have, e.g., an elliptical shape or a polygonal shape. For purposes of the invention, it is not essential that the stem itself has a circular outer contour. The stem likewise can have an elliptical shape or a polygonal shape, e.g., such as shown in FIG. 7 in which the stem 52 has a shape of a triangle with curved side lines. The stem can also have a shape of a regular hexahedron.

As shown in FIG. 1, the drill 1 according to the present invention is solded to the connection element 4 provided with a shank 5. The connection element 4 can also be connected to the stem 2 by friction welding. It should be understood that a shank, e.g., can be formed directly on the stem. If this is the case, a modified chuck with integrated suction means becomes necessary. The drill according to the present invention was described as a suction drill. However, it should be understood that a reverse application of the drill is also possible. E.g., the stem through-bores, together with their mouth openings, can be used for rincing a bore with air or be used for delivering a drilling fluid.

Though the present invention was shown and described with references to the preferred embodiments, various modifications thereof will be apparent to those skilled in the art and, therefore, it is not intended that the invention be limited to the disclosed emobidments or details thereof, and departure can be made therefrom with the spirit and scope of the appended claims.

What is claimed is:

1. A drill for forming bores in constructional components, comprising a sleeve-shaped stem having an axially extending through-bore opening into mouth openings formed in opposite sections of the stem; a shank provided at a rear end of the stem for connecting the drill to a drilling tool; and a drilling head provided with lips and formed of a hard material and secured in at least one slot formed in a free front end of the stem, a section of the drilling head being embedded in the stem, flatly engaging a material of the stem and being fixedly connected with the stem material.

2. A drill according to claim 1, wherein the drilling head-receiving slot extends approximately radially in the free front end of the stem.

3. A drill according to claim 1, wherein the section of the drilling head embedded into the stem has, over a large portion of a circumference of the embedded section, an outer contour corresponding to a contour of an inner wall of the sleeve-shaped stem and flatly engaging the inner wall.

4. A drill according to claim 1, wherein the through-bore has a cross-section which deviates from a circular shape at least in the stem embedding region for the drilling head.

5. A drill according to claim 1, wherein a portion of the front end section forming an embedding region for the drilling head is substantially solid.

6. A drill according to claim 5, wherein the embedding region-forming portion has a smaller cross-section than an adjoining section of the stem.

7. A drill according to claim 1, wherein the stem has at least two slots for receiving the drilling head with a smallest angular distance there between from 90° to 180°.

8. A drill according to claim 7, wherein the at least two drilling head-receiving slots extend approximately radially.

9. A drill for forming bores in constructional components, comprising a sleeve-shaped stem having an axially extending through-bore opening into mouth openings formed in opposite sections of the stem; a shank provided at a rear end of the stem for connecting the drill to a drilling tool; and a drilling head provided with lips and formed of a hard material and secured in at least one slot formed in a free front end of the stem, a section of the drilling head being embedded in the stem, flatly engaging a material of the stem and being fixedly connected with the stem material, wherein at least one mouth opening of the through-bore provided in a front end section of the stem is offset backward with respect to a lip.

10. A drill according to claim 9, wherein the at least one mouth opening is oriented substantially in a direction of an outer surface of the stem.

11. A drill according to claim 9, wherein the at least one mouth opening is formed by a mouth of a channel formed in the drilling head.

12. A drill according to claim 11, wherein the head channel extends to the through-bore at an angle from 10° to 70°.

13. A drill according to claim 9, wherein the at least one mouth opening is limited by the drilling head and the inner wall of the stem and is formed by an indentation provided at least at one of the front end of the stem and in the drilling head.

14. A drill according to claim 9, wherein the at least one mouth opening is formed as a bore provided in the wall of the front end section of the stem .

15. A drill according to claim 9, wherein the at least one mouth opening has a cross-section which is smaller than a cross-section of the through-bore.

16. A drill according to claim 15, wherein the cross-section of the mouth opening amounts to 30% to 70% of the cross-section of the through-bore.

17. A drill for forming bores in constructional components, comprising a sleeve-shaped stem having an axially extending through-bore opening into mouth openings formed in opposite sections of the stem; a shank provided at a rear end of the stem for connecting the drill to a drilling tool; and a drilling head provided with lips and formed of a hard material and secured in at least one slot formed in a free front end of the stem, a section of the drilling head being embedded in the stem, flatly engaging a material of the stem and being fixedly connected with the stem material, wherein the sleeve-shaped stem has an outer contour deviating from a circular shape at least in the stem embedding region for the drilling head.

18. A drill for forming bores in constructional components, comprising a sleeve-shaped stem having an axially extending through-bore opening into mouth openings formed in opposite sections of the stem; a shank provided at a rear end of the stem for connecting the drill to a drilling tool; and a head provided with lips and formed of a hard material and secured in at least one slot formed in a free front end of the stem, a section of the drilling head being embedded in the stem, flatly engaging a material of the stem and being fixedly connected with the stem material, wherein the stem has at least two slots for receiving the drilling head with a smallest angular distance therebetween from 90° to 180° and wherein the stem has three approximately radially extending slots for receiving the drilling head and extends to an outer surface of the front section, with the front section having a substantially polygon-like outer contour, at an angle of about 90°+10°.

* * * * *